United States Patent [19]

Tomase et al.

[11] Patent Number: 5,173,836
[45] Date of Patent: Dec. 22, 1992

[54] HERMETICALLY SEALED INTERFACE

[75] Inventors: Joseph P. Tomase, Libertyville; Shiuh-Hui Chen, Lake Zurich; Gregory D. Stamm, LaGrange; Marc K. Chason, Schaumburg, all of Ill.

[73] Assignee: Motorola, Inc., Schaumburg, Ill.

[21] Appl. No.: 846,109

[22] Filed: Mar. 5, 1992

[51] Int. Cl.[5] .......................... G01L 9/12; H01G 5/16
[52] U.S. Cl. .................................. 361/283; 29/25.41; 73/724
[58] Field of Search .................. 361/283; 73/718, 724; 29/25.41, 25.42; 204/16

[56] References Cited

U.S. PATENT DOCUMENTS

| | | | |
|---|---|---|---|
| 3,748,571 | 7/1973 | Kurtz | 361/283 |
| 4,833,039 | 5/1989 | Mitoff et al. | 428/552 |
| 4,875,134 | 10/1989 | Kuisma | 361/283 |

*Primary Examiner*—Donald Griffin
*Attorney, Agent, or Firm*—Phillip H. Melamed

[57] ABSTRACT

A hermetically sealed interface is constructed with a substrate (101) having a first surface (103) with a first orifice (201). The substrate (101) also has an opposing second surface (105) with a second orifice (205). The first and second orifices (201, 205) are connected via a passageway (107). The passageway (107) has an inner surface (209) with a first metal coating (111). The first metal coating (111) and the substrate (101) provide a first predetermined thermal coefficient of expansion for the passageway (107). A plug (221) with an outer surface (223) has a second metal coating (225). The second metal coating (225) and the plug (221) provide a second predetermined thermal coefficient of expansion substantially similar to the first predetermined thermal coefficient of expansion of the passageway (107). The plug (221) is disposed in the passageway (107) of the substrate (101). The first metal coating (111), of the inner surface (209) of the passageway (107), and the second metal coating (225), of the outer surface (223) of the plug (221), are bonded together and provide, with the plug, (221) a hermetic barrier between the first and second orifices (201, 205) of the substrate (101). Preferably, this hermetically sealed interface is used in a capacitive pressure sensor.

31 Claims, 1 Drawing Sheet

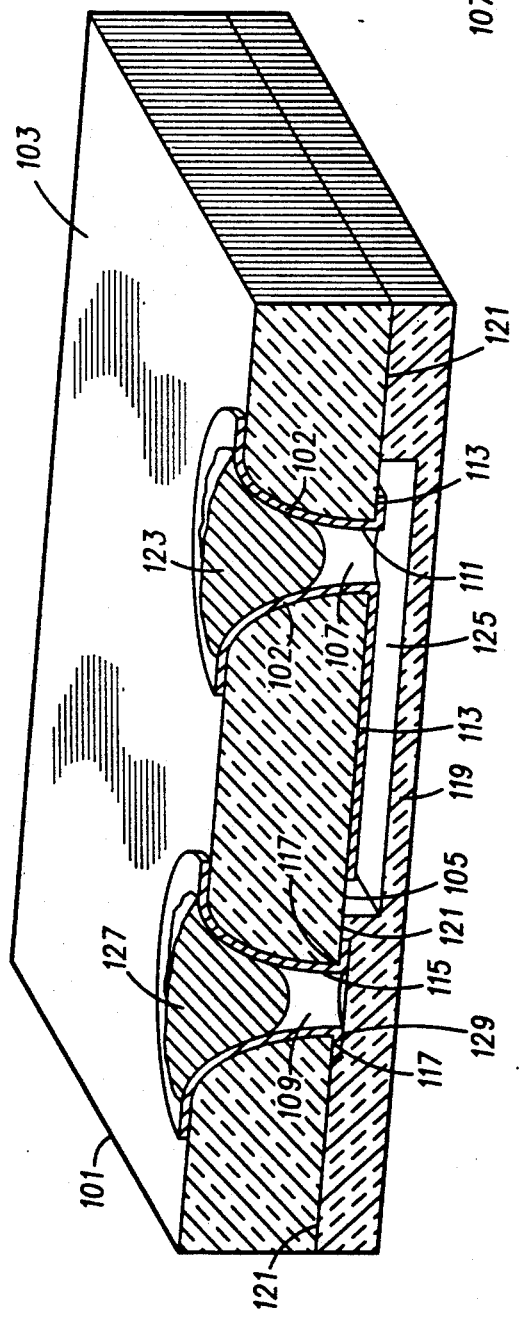
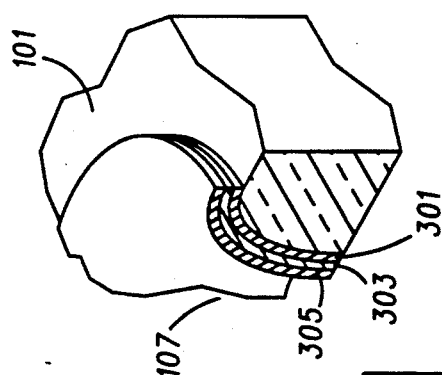
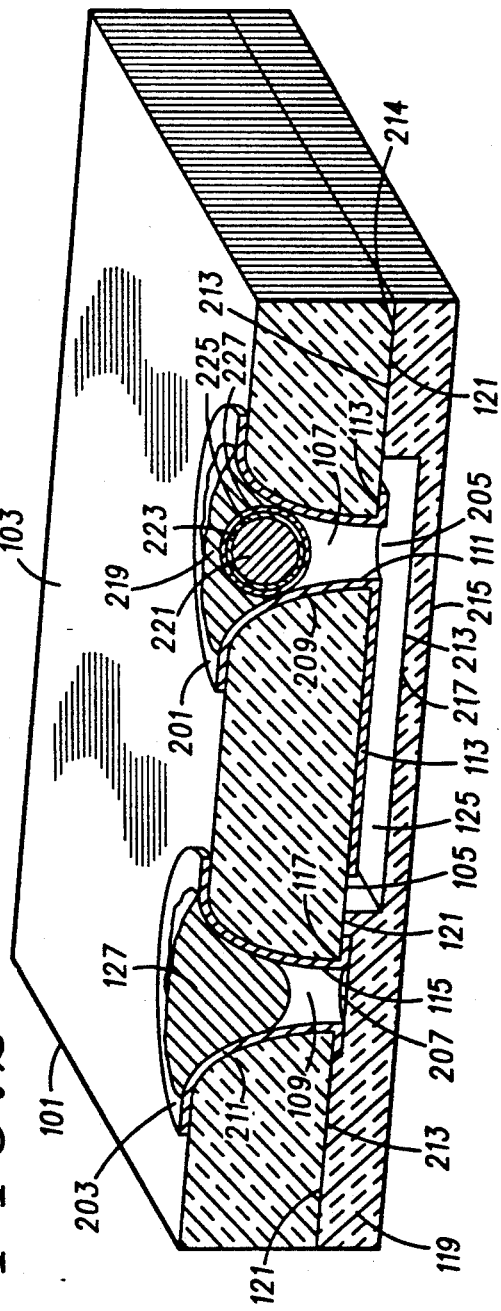

HERMETICALLY SEALED INTERFACE

FIELD OF THE INVENTION

This invention is generally directed to a method for hermetically sealing interfaces in electronic packages and may be applied to hermetically sealing an interface in a pressure sensor.

BACKGROUND OF THE INVENTION

Hermetically sealed interfaces have been fabricated by the application of metal and glass structures. Metal and glass are often used to create these hermetically sealed interfaces because of the need to have a conductive element, such as metal, for carrying electrical signals across a hermetically sealed interface typically constructed with a non-conductive element, such as glass. These materials are fused into a structure by many different processes. These processes can include the disposing of a liquefied metal into, a solid glass structure having a passageway therein, and then the solidification of the metal forming a hermetically sealed interface.

All of these, metal and glass, structures can suffer from a common problem. This problem is the failure of the fused hermetic interface when the metal and glass structures are subjected to a large temperature transition. These failures occur because of the difference in the thermal coefficient of expansion of metal and glass. For example, if the metal is solder, the solder will shrink to a much greater extent than the glass during a falling temperature transition. This results in a large strain at the fused hermetic interface, causing a crack in the glass, a crack directly between the solder and the glass, or a crack in the solder. Many thermal transitions may be necessary before these failures of the hermetic interface occur.

In a specific example, FIG. 1 illustrates a cross section of a prior art silicon capacitive pressure sensor using a metal and glass structure to hermetically seal an interface between a pressurized sealed chamber 125, in which a reference pressure is stored, and the top of a glass substrate 101, where electrical interconnection to the capacitive element is provided. The glass substrate 101 has a first surface 103 and an opposing second surface 105. A first passageway 107, and a second passageway 109 are provided through the glass substrate 101. The first passageway 107 is then processed to include an electrically conductive metal layer 111 that extends to a first predetermined area 113 on the opposing second surface 105. The second passageway 109 is also processed to include a metal layer 115 that extends to a second predetermined area 117 on the opposing second surface 105 of the glass substrate 101.

A semiconductor substrate 119 is then attached to the opposing second surface 105 of the glass substrate 101 at locations shown by reference number 121 and to the second predetermined area 117. This attachment between the glass on the opposing second surface 105 and the semiconductor substrate 119, at locations shown by reference number 121, is performed by anodic, or electrostatic, bonding. This anodic bond hermetically seals the glass and semiconductor substrate at locations shown by reference number 121. The bond between the metal layer 115 that extends to a second predetermined area 117 and the semiconductor substrate 119, indicated by reference number 129, is the result of a chemical reaction that fuses the semiconductor substrate 119 and the metal layer 115 with heat and pressure.

The chamber 125 is then pressurized and a quantity of solder 123, 127 is melted into the first and second passageways 107, 109. The solder 123 is the first passageway, when cool, forms a hermetic interface for sealing the chamber 125 and provides an electrical contact to an element of a capacitor, formed by the metal layer covering the predetermined area 113. The solder 127 in the second passageway 109 provides an electrical connection to a second element of the capacitor formed by the semiconductor substrate 119. The solder 123, 127 formed in the first and second passageways 107, 109 is used to connect the capacitor to a measurement circuit. When this capacitor is subjected to differing pressures, a portion of the semiconductor substrate 119 moves, in relationship to the metalized first predetermined area 113, causing a change in distance between the elements of the capacitor and thus capacitance.

The construction and hermetic sealing of the first passageway 107 is of particular concern. The temperature coefficient of solder and glass is substantially different. When the solder and glass structures are subjected to a temperature transition they expand or contract at different rates because of differing thermal coefficients of expansion. The differing rates cause stress to build up in the solder, 123 and at the location of the glass 102 and solder 123 interface. This is undesirable because during large temperature transitions the glass 102 and solder 123 will be over stressed and either or both will crack. This cracking causes the hermetic seal to be broken. When this seal is broken the reference pressure is released and the sensor no longer can function as desgned. Similar cracks in the glass-solder interface for the second passageway 109 have no effect on the chamber 125 because of the anodic bond at the location shown by reference number 121. This anodic bond isolates the chamber 125 from any breaches in the second passageway 109.

What is needed is an improved way of hermetically sealing this first passageway while maintaining an electrically conductive path between the surfaces 103 and 105.

SUMMARY OF THE INVENTION

A hermetically sealed interface is constructed with a substrate having a first surface with a first orifice. The substrate also has an opposing second surface with a second orifice. The first and second orifices are connected via a passageway. The passageway has an inner surface with a first metal coating. The first metal coating and the substrate provide a first predetermined thermal coefficient of expansion for the passageway. A plug with an outer surface has a second metal coating. The second metal coating and the plug provide a second predetermined thermal coefficient of expansion substantially similar to the first predetermined thermal coefficient of expansion of the passageway. The plug is disposed in the passageway of the substrate. The first metal coating, of the inner surface of the passageway, and the second metal coating, of the outer surface of the plug, are bonded together and provide, with the plug, a hermetic barrier between the first and second orifices of the substrate.

BRIEF DESCRIPTION OF THE DRAWINGS

FIG. 1 is a schematic diagram of a prior art hermetically sealed pressure sensor as described in the Background of the Invention.

FIG. 2 is a schematic diagram of a hermetically sealed pressure sensor constructed in accordance with the invention.

FIG. 3 is a schematic diagram of a metalized glass passageway, useful in a hermetically sealed pressure sensor, constructed in accordance with the invention.

DETAILED DESCRIPTION OF A PREFERRED EMBODIMENT

FIG. 2 illustrates a silicon capacitive pressure sensor with a hermetically sealed interface. Note that reference numbers used in FIG. 2 identical to the reference numbers used in FIG. 1 are used to identify identical corresponding elements. A glass substrate 101 having a first surface 103 and an opposing second surface 105 is provided. A first laser drilled passageway 107 originates at a first orifice 201, on the first surface 103. The first passageway 107 has a first inner surface 209 and extends to a third orifice 205 on the opposing second surface 105. A second laser drilled passageway 109 originates at a second orifice 203, on the first surface 103. The second passageway 109 continues, providing a second inner surface 211 that extends to a fourth orifice 207 on the opposing second surface 105.

A first metal coating 111, comprised of successive layers of chromium, nickel vanadium, and gold, is disposed starting at the first orifice 201. This coating 111 then extends through the first passageway 107 on the first inner surface 209 past the second orifice 205 to a first predetermined area 113 on the opposing second surface 105 of the glass substrate 101. This predetermined area 113 serves as a first electrode of a capacitor. As discussed in the background, the first metal coating 111 and the substrate 101 provide a first predetermined thermal coefficient of expansion for the first passageway 107.

A second metal coating 115, comprised of successive layers of chromium, nickel vanadium, and gold, is disposed starting at the third orifice 203. This coating 115 then extends through the second passageway 109 on the second inner surface 211 past the fourth orifice 207 to a second predetermined area 117 on the opposing second surface 105 of the glass substrate 101.

Further, a semiconductor substrate 119 is provided with a first surface 213 and an opposing second surface 215. The first surface 213 includes a recessed portion 217 surrounded by a non-recessed portion 214. The non-recessed portion 214 of the semiconductor substrate 119 is anodically bonded to the opposing second surface 105 of the essentially planar glass substrate 101 at peripheral locations as shown by reference number 121. The non-recessed portion 214 of the semiconductor substrate 119 is also anodically bonded to the second predetermined area 117. This semiconductor substrate 119 serves as a second electrode of the capacitor.

We now turn our attention to the invention at hand. A glass plug or ball 221, in the form of a sphere, has an outer surface 223 with a metal coating 225 disposed on the outer surface 223. Further, a metal alloy, in this case a solder mixture 227, made up of a combination of tin and lead, is disposed on this metal coating 225, the combination forming a metalized sphere. This metalized sphere is disposed into the first passageway 107 through the first orifice 201. The metalized sphere has a dimension, in this case a diameter, larger than the width of the first passageway 107 so as to prevent passage between the first and second orifices 201, 205. A quantity of solder 127 is disposed in the second passageway 207 through the second orifice 203. This assembly is then pressurized by applying a predetermined vacuum pressure external to the substrate by disposing the assembly in a bell jar. Once the predetermined vacuum pressure is drawn the assembly is heated so that the solder 127 melts (reflows) and further, so that the solder 227 present on the solder coated metalized sphere melts and alloys itself through a chemical reaction to the coating 111 on the wall of the first passageway 209. When the solder cools it forms a hermetic seal for the now sealed chamber 125 in which a predetermined vacuum pressure is stored. Then the pressure in the bell jar is released. The chemical reaction, between the coating 111 and the solder 227, is caused because the gold and nickel vanadium of the first passageway 107 and the lead and tin in the solder 227 have a strong preference for wetting causing the lead and tin to wet to the gold and nickel vanadium. Preferably, the term solder, as used here, refers to a tin and lead alloy. In the preferred embodiment an alloy of 90% lead and 10% tin is used. Of course, other mixtures and solder compositions can also be used.

Because of the use of the materials selected above, the thermal coefficient of expansion of the area of the glass substrate 101 and first metal coating 111 of the first passageway 107 is substantially the same as the thermal coefficient of expansion of the solder coated metalized glass ball. Thus, during thermal transitions no significant stress is created and the hermetic seal remains intact.

Of course, the precise sequence of each step of this process may not be critical and other sequences could also be used to form this hermetic interface. It also may be desirable to add additional solder 219, as shown in FIG. 2, to be alloyed between the first metal coating 111 of the first passageway 107 and the solder 227 on the metalized glass ball for added strength. This additional solder 219 has a lower melting temperature than the solder 227 on the metalized glass ball.

In FIG. 3 the first metal coating 111 of the first passageway 107 is detailed. The substrate 101 is preferably coated with successive layers of chromium 301, nickel vanadium 303, and gold 305. These materials are useful in constructing a capacitive pressure sensor. However, as long as the metal selected has a desired bonding reaction to the metalized glass ball it will suffice.

The principles taught in this embodiment can be applied with many different conductive and non conducive materials that have significantly different thermal coefficients of expansion. Although this embodiment discusses a capacitive pressure sensor interface, this invention can be applied to other hermetic sealing problems where an insulated electrical contact is required.

What is claimed is:

1. A hermetically sealed interface comprising:
a substrate having a first surface with a first orifice, said substrate having an opposing second surface with a second orifice, the first and second orifices connected via a passageway in said substrate, the passageway having an inner surface with a first metal coating disposed at least on the inner surface, the first metal coating and said substrate providing a first predetermined thermal coefficient of expansion for the passageway; and a plug with an outer surface, said plug having a second metal coating disposed on the outer surface, the second metal coating and said plug providing a second predetermined thermal coefficient of expansion for said coated plug substantially similar to the first predetermined thermal coefficient of expansion of the passageway, said plug disposed in the passageway of said substrate, wherein the first metal coating of the inner surface of the passageway of said substrate and the second metal coating of the outer surface of said plug are bonded together and provide, with said plug, a hermetic barrier between the first and second orifices of said substrate.

2. A hermetically sealed interface in accordance with claim 1 wherein the first metal coating of the inner surface of the passageway of said substrate and the second metal coating of the outer surface of said plug are alloyed and provide, with said plug, a hermetic barrier between the first and second orifices of said substrate.

3. A hermetically sealed interface in accordance with claim 1 wherein said plug is essentially spherical.

4. A hermetically sealed interface in accordance with claim 3 wherein said essentially spherical plug is further comprised of a glass material.

5. A hermetically sealed interface in accordance with claim 1 wherein said substrate comprises a glass substrate.

6. A hermetically sealed interface in accordance with claim 1 wherein said plug has a dimension sufficiently large so as to prevent passage through the passageway between the first and second orifices of said substrate.

7. A hermetically sealed interface in accordance with claim 1 further comprising a third metal coating disposed on the second metal coating of the outer surface of said plug.

8. A hermetically sealed interface in accordance with claim 7 wherein said third metal coating comprises the metal lead and the metal tin.

9. A hermetically sealed interface in accordance with claim 1 wherein the first metal coating disposed on the inner surface of the passageway of said substrate comprises successive layers of chromium, nickel vanadium, and gold.

10. A hermetically sealed interface in accordance with claim 1 further comprising solder disposed between and joining the first metal coating of the first surface of said substrate and the second metal coating of the outer surface of said plug.

11. A hermetically sealed interface in accordance with claim 1 wherein the second orifice opens into a sealed chamber in which a predetermined pressure is confined.

12. A hermetically sealed interface comprising:
an essentially planar glass substrate having a first surface with a first orifice, said substrate having a opposing second surface with a second orifice, the first and second orifices connected via a passageway in said substrate, the passageway having an inner surface with a first metal coating disposed at least on the inner surface, the first metal coating and said substrate providing a first predetermined thermal coefficient of expansion for the passageway; and a glass plug with an outer surface, said plug having a second metal coating disposed on the outer surface, the second metal coating and said plug providing a second predetermined thermal coefficient of expansion for said coated plug substantially similar to the first predetermined thermal coefficient of expansion of the passageway, said plug disposed in the passageway of said substrate, wherein the first metal coating of the inner surface of the passageway of said substrate and the second metal coating of the outer surface of said plug are alloyed and provide, with said plug, a hermetic barrier between the first and second orifices of said substrate.

13. A hermetically sealed interface in accordance with claim 12 wherein said glass plug is essentially spherical.

14. A hermetically sealed interface in accordance with claim 12 further comprising a third metal coating disposed on the second metal coating of the outer surface of said plug.

15. A hermetically sealed interface in accordance with claim 14 wherein said third metal coating comprises the metal lead and the metal tin.

16. A hermetically sealed interface in accordance with claim 12 wherein the first metal coating disposed on the inner surface of the passageway of said substrate comprises successive layers of chromium, nickel vanadium, and gold.

17. A hermetically sealed interface in accordance with claim 12 wherein said first metal coating extends onto the first surface of said essentially planar glass substrate.

18. A hermetically sealed interface in accordance with claim 12 wherein said first metal coating extends onto the opposing second surface of said essentially planar glass substrate.

19. A hermetically sealed interface in accordance with claim 12 further comprising solder disposed between and joining the first metal coating disposed on the inner surface of the passageway of said substrate and the second metal coating of the outer surface of said plug.

20. A silicon capacitive pressure sensor comprising:
an essentially planar glass substrate having a first surface with first and second orifices, said essentially planar glass substrate having a opposing second surface with third and fourth orifices, the first and third orifices connected via a first passageway, the first passageway having a first inner surface with a first metal coating disposed on the first inner surface the first passageway and extending to a first predetermined area on the opposing second surface, and the second and fourth orifices connected via a second passageway, the second passageway having a second inner surface with a second metal coating disposed on the second inner surface and extending to a second predetermined area on the opposing second surface, and wherein the first metal coating and said essentially planar glass substrate provide a first predetermined thermal coefficient of expansion for the first passageway;

a semiconductor substrate having a first surface and an opposing second surface, the first surface of said semiconductor substrate having a recessed portion completely surrounded by a non-recessed portion of the first surface, of said semiconductor substrate, wherein the non-recessed portion of said semiconductor substrate is anodically bonded to said opposing second surface of said essentially planar glass substrate and contacts the second metal coating of the second predetermined area on the opposing second surface and, wherein the first metal coating that extends to the first predetermined area on the opposing second surface and said semiconductor substrate form opposing elements of a capacitor, and wherein the recessed portion of the semiconductor substrate and said essentially planar glass substrate form a chamber in which a reference pressure is stored, the chamber opening into the third orifice; and a glass plug with an outer surface, said glass plug having a third metal coating disposed on the outer surface, the third metal coating and said glass plug providing a second predetermined thermal coefficient of expansion for the coated plug substantially similar to the first predetermined thermal coefficient of expansion of the passageway, said glass plug disposed in the first passageway of said essentially planar glass substrate, and wherein the first metal coating provided in the first passageway and the third metal coating disposed on the outer surface of said glass plug are alloyed and provide, with said glass plug, a hermetic barrier between the first and third orifices of said substrate.

21. A silicon capacitive pressure sensor in accordance with claim 20 wherein said plug is essentially spherical.

22. A silicon capacitive pressure sensor in accordance with claim 21 wherein said essentially spherical plug is comprised of a glass material.

23. A silicon capacitive pressure sensor in accordance with claim 20 wherein the first metal coating disposed on the inner surface of the passageway of said substrate comprises successive layers of chromium, nickel vanadium, and gold.

24. A hermetically sealed interface in accordance with claim 20 further comprising solder disposed between and joining the first metal coating disposed on the inner surface of the passageway of said substrate and the third metal coating of the outer surface of said plug.

25. A hermetically sealed interface in accordance with claim 20 wherein the first metal coating disposed on the first inner surface of the first passageway provides an electrical connection between the first surface and the opposing second surface of said essentially planar glass substrate.

26. A method for fabricating a hermetically sealed interface comprising the steps of:
providing a substrate with a passageway therein;
disposing a metal coating in the passageway;
providing a plug;
disposing a solder coating on the plug, forming a solder coated plug;
disposing the solder coated plug into the metal coated passageway;
applying a predetermined pressure external to the substrate;
heating the substrate so that the solder around the plug melts, joining the plug to the metalized passageway;
cooling the substrate assembly forming a hermetically sealed interface between the glass ball and the passageway; and
releasing the external predetermined pressure through the passageway.

27. A method for fabricating a hermetically sealed interface in accordance with claim 26 further comprising the steps of:
disposing a lower melting temperature solder alloy on the solder coated glass ball facing said first surface; and
reflowing said lower melting temperature solder alloy.

28. A method for fabricating a hermetically sealed interface in accordance with claim 26 wherein the step of applying a predetermined pressure further comprises the step of drawing a vacuum.

29. A method for fabricating a hermetically sealed interface in accordance with claim 26 including the step of providing a chamber into which said passageway opens, and wherein said cooling step results in storing the predetermined pressure in said chamber.

30. A method for fabricating a silicon capacitive pressure sensor comprising the steps of:
providing a planar glass substrate;
laser drilling a passageway into the planar glass substrate;
disposing a metal coating in the passageway;
providing a metalized glass ball;
disposing a solder coating on the metalized glass ball, forming a solder coated metalized glass ball;
disposing the solder coated metalized glass ball into the metal coated passageway;
applying a predetermined pressure external to the substrate;
heating the substrate so that the solder around the metalized glass ball melts joining the metalized glass ball to the metalized passageway;
cooling the substrate assembly forming a hermetically sealed interface between the glass ball and the passageway; and
releasing the external predetermined pressure.

31. A method for fabricating a silicon capacitive pressure sensor in accordance with claim 30 further comprising the steps of:
disposing a lower melting temperature solder alloy on the solder coated glass ball facing said first surface; and
reflowing said lower melting temperature solder alloy.

* * * * *